(12) United States Patent
Fujisawa et al.

(10) Patent No.: US 7,148,290 B2
(45) Date of Patent: Dec. 12, 2006

(54) RUBBER COMPOSITION FOR GOLF BALL

(75) Inventors: Koichi Fujisawa, Kobe (JP); Yoshikazu Yabuki, Kobe (JP)

(73) Assignee: SRI Sports Limited, Kobe (JP)

( * ) Notice: Subject to any disclaimer, the term of this patent is extended or adjusted under 35 U.S.C. 154(b) by 0 days.

(21) Appl. No.: 11/121,082

(22) Filed: May 4, 2005

(65) Prior Publication Data

US 2005/0192399 A1 Sep. 1, 2005

Related U.S. Application Data

(62) Division of application No. 10/286,821, filed on Nov. 4, 2002, now abandoned.

(30) Foreign Application Priority Data

Nov. 20, 2001 (JP) .............................. 2001-354777

(51) Int. Cl.
  C08L 9/00 (2006.01)
  A63B 37/00 (2006.01)
  A63B 37/06 (2006.01)
(52) U.S. Cl. ...................... 525/193; 525/236; 525/269; 525/274; 473/371; 473/377
(58) Field of Classification Search .................. None
   See application file for complete search history.

(56) References Cited

U.S. PATENT DOCUMENTS

| | | |
|---|---|---|
| 4,683,257 A | 7/1987 | Kakiuchi et al. |
| 4,929,678 A | 5/1990 | Hamada et al. |
| 4,955,613 A | 9/1990 | Gendreau et al. |
| 5,508,350 A * | 4/1996 | Cadorniga et al. .......... 525/193 |
| 6,194,505 B1 | 2/2001 | Sone et al. |
| 6,210,292 B1 | 4/2001 | Higuchi et al. |
| 6,277,924 B1 * | 8/2001 | Hamada et al. .......... 525/332.3 |
| 6,315,684 B1 * | 11/2001 | Binette et al. .............. 473/377 |
| 6,336,873 B1 | 1/2002 | Yamagishi et al. |
| 6,482,930 B1 | 11/2002 | Kwag et al. |
| 6,596,801 B1 | 7/2003 | Higuchi et al. |
| 6,712,715 B1 | 3/2004 | Higuchi et al. |
| 2003/0207970 A1 * | 11/2003 | Higuchi et al. ............. 524/263 |

FOREIGN PATENT DOCUMENTS

| | | |
|---|---|---|
| EP | 897732 A2 | 2/1999 |
| JP | 62-89750 A | 4/1987 |
| JP | 2644226 B2 | 5/1997 |
| JP | 2678240 B2 | 8/1997 |
| JP | 11-319148 A | 11/1999 |
| JP | 2001149508 * | 6/2001 |

* cited by examiner

*Primary Examiner*—David J. Buttner
(74) *Attorney, Agent, or Firm*—Birch, Stewart, Kolasch & Birch, LLP

(57) ABSTRACT

A rubber composition for a golf ball having excellent rebound characteristics and excellent durability, and showing good workability, which contains a base rubber, a co-crosslinking agent, an organic peroxide and an inorganic filler, wherein the base rubber includes a polybutadiene containing a cis-1,4 bond of not less than 80%, having a Mooney viscosity of not less than 30 to less than 50 $ML_{1+4}(100°\ C.)$ and a ratio (Mw/Mn) of the weight average molecular weight (Mw) to the number average molecular weight (Mn) of 3.0 to 6.0, synthesized using a lanthanide-containing catalyst.

3 Claims, No Drawings

RUBBER COMPOSITION FOR GOLF BALL

This application is a Divisional of Application No. 10/286,821, filed on Nov. 4, 2002, now abandoned and for which priority is claimed under 35 U.S.C. §120; and this application claims priority of application Ser. No. 2001-354777 filed in Japan on Nov. 20, 2001 under 35 U.S.C. §119; the entire contents of all are hereby incorporated by reference.

FIELD OF THE INVENTION

The present invention relates to a rubber composition for golf ball. More particularly, the present invention relates to a rubber composition for obtaining a golf ball having excellent rebound characteristics and excellent durability, and showing good workability when processing.

BACKGROUND OF THE INVENTION

Hitherto, a rubber composition comprising a polybutadiene containing a cis-1,4 bond of not less than 80%, synthesized using nickel-containing catalyst, has been suitably used as a rubber composition for a one-piece solid golf ball, a core of a two-piece golf ball or three-piece golf ball, or a solid center of a thread wound golf ball, when considering rebound characteristics and durability. It is also known that a polybutadiene, synthesized using lanthanide-containing catalyst, can be used for the same application.

It is disclosed, for example, in Japanese Patent Kokoku Publication No. 80123/1994 that a mixture consisting of (i) a polybutadiene containing a cis-1,4 bond of not less than 40%, having a Mooney viscosity of 70 to 100 $ML_{1+4}$(100° C.), synthesized using nickel-containing catalyst and/or cobalt-containing catalyst, and (ii) a polybutadiene containing a cis-1,4 bond of not less than 40%, having a Mooney viscosity of 30 to 90 $ML_{1+4}$ (100° C.), synthesized using a catalyst consisting of lanthanide rare earth elements-containing compound, or a polybutadiene containing a cis-1,4 bond of not less than 40%, having a Mooney viscosity of 20 to 50 $ML_{1+4}$(100° C.), synthesized using nickel-containing catalyst and/or cobalt-containing catalyst can be suitably used as a rubber composition for golf balls. When polybutadiene (i) is used for the rubber composition, the rebound characteristics of the resulting golf ball are improved. However, when polybutadiene (ii) having a high Mooney viscosity is used in combination with polybutadiene (i), the workability in processing is degraded.

It is disclosed in Japanese Patent No. 2644226 that a polybutadiene containing a cis-1,4 bond of not less than 80% and having a Mooney viscosity of 45 to 90 $ML_{1+4}$(100° C.) and a ratio (Mw/Mn) of weight average molecular weight (Mw) to number average molecular weight (Mn) of 4.0 to 8.0 can be suitably used for golf balls. Although the use of the polybutadiene imparts sufficient physical properties to golf balls, improvement in rebound characteristics and durability is further required.

It is disclosed in Japanese Patent No. 2678240 that a mixture of 85 to 15 phr of a nickel- or cobalt-catalyzed polybutadiene having a cis-1,4 content of more than 40% and a Mooney viscosity of less than 50, and 15 to 85 phr of a lanthanide-catalyzed polybutadiene having a cis-1,4 content of more than 40% and a Mooney viscosity of less than 50 can be suitably used for a golf ball. However, when using a mixture of the nickel- or cobalt-catalyzed polybutadiene having low Mooney viscosity (less than 50) and the lanthanide-catalyzed polybutadiene having low Mooney viscosity (less than 50), the rebound characteristics and durability of the resulting golf ball are not sufficiently obtained.

In Japanese Patent Kokai Publication No. 319148/1999, a solid golf ball comprising a core and a cover covering the core, of which the core comprises at least one rubber layer formed from a rubber composition comprising a polybutadiene mixture, unsaturated carboxylic acid or a metal salt of unsaturated carboxylic acid, organic peroxide and inorganic filler, is disclosed. The polybutadiene mixture consists of (a) a polybutadiene containing a cis-1,4 bond of not less than 80 molar %, having a Mooney viscosity of 50 to 69 $ML_{1+4}$(100° C.) and a ratio (Mw/Mn) of weight average molecular weight (Mw) to number average molecular weight (Mn) of 4.0 to 8.0, synthesized using nickel-containing catalyst and/or cobalt- containing catalyst, and (b) a polybutadiene containing a cis-1,4 bond of not less than 40%, having a Mooney viscosity of 20 to 90 $ML_{1+4}$ (100° C.), synthesized using lanthanide-containing catalyst, and a weight ratio (a)/(b) is 30/70 to 90/10. However, workability while processing is degraded and rebound characteristics of the resulting golf ball are not sufficiently obtained.

OBJECTS OF THE INVENTION

A main object of the present invention is to provide a rubber composition for producing a golf ball having excellent rebound characteristics and excellent durability, and exhibiting good workability when processing.

According to the present invention, the object described above is accomplished by using a rubber composition comprising a polybutadiene synthesized using lanthanide-containing catalyst, and adjusting the Mooney viscosity and molecular weight distribution (Mw/Mn) of the polybutadiene to a specified range, thereby providing a rubber composition for producing a golf ball having excellent rebound characteristics and excellent durability, and showing good workability when processing.

SUMMARY OF THE INVENTION

The present invention provides a rubber composition for a golf ball comprising a base rubber, a co-crosslinking agent, an organic peroxide and an inorganic filler, wherein the base rubber comprises a polybutadiene (a) containing a cis-1,4 bond of not less than 80%, having a Mooney viscosity of not less than 30 to less than 50 $ML_{1+4}$(100° C.) and a ratio (Mw/Mn) of weight average molecular weight (Mw) to number average molecular weight (Mn) of 3.0 to 6.0, synthesized a using lanthanide-containing catalyst.

Generally, polybutadiene synthesized using a lanthanide-containing catalyst tends to exhibit good rebound characteristics, but poor workability during processing and poor durability. On the other hand, generally, polybutadiene synthesized using a cobalt-containing catalyst or a nickel-containing catalyst tends to have good workability when processing but poor rebound characteristics. The reason for this is that different combinations of viscosity and molecular weight distribution are obtained depending on the type of the catalyst selected.

A mixture of polybutadienes synthesized using a cobalt-containing catalyst or a nickel-containing catalyst and polybutadiene synthesized using a lanthanide-containing catalyst has been used for the rubber composition of a golf ball as described above, but the polybutadiene synthesized using lanthanide-containing catalyst has not been used alone for the rubber composition for golf ball. It is for the reason described above.

In the present invention, a golf ball containing good workability when processing, excellent rebound characteristics and excellent durability is achieved by adjusting the Mooney viscosity and molecular weight distribution (Mw/Mn) of the polybutadiene, synthesized using a lanthanide-containing catalyst.

In order to put the present invention into a more suitable practical application, it is preferable that:

the base rubber is a polybutadiene mixture consisting of the polybutadiene (a) and a polybutadiene (b) containing a cis-1,4 bond of not less than 40%, having a Mooney viscosity of not less than 55 to less than 70 $ML_{1+4}(100°$ C.), synthesized using a lanthanide-containing catalyst, with a weight ratio (a)/(b) being 30/70 to 90/10;

the base rubber is a polybutadiene mixture consisting of the polybutadiene (a) and a polybutadiene (c) containing a cis-1,4 bond of not less than 40%, having a Mooney viscosity of not less than 30 to less than 50 $ML_{1+4}(100°$ C.) and a ratio (Mw/Mn) of weight average molecular weight (Mw) to number average molecular weight (Mn) of 3.6 to 8.0, synthesized using cobalt-containing catalyst and/or nickel-containing catalyst, the weight ratio (a)/(c) being 86/14 to 90/10;

the base rubber be is a polybutadiene mixture consisting of the polybutadiene (a) and a polybutadiene (d) containing a cis-1,4 bond of not less than 40%, having a Mooney viscosity of not less than 50 $ML_{1+4}(100°$ C.) and a ratio (Mw/Mn) of weight average molecular weight (Mw) to number average molecular weight (Mn) of not less than 2.0 to less than 4.0, synthesized using a cobalt-containing catalyst, the weight ratio (a)/(c) being 30/70 to 90/10; and the polybutadiene (b) has a ratio (Mw/Mn) of weight average molecular weight (Mw) to number average molecular weight (Mn) of 1.0 to 3.0.

In another embodiment, the present invention relates to a one-piece solid golf ball formed from the rubber composition, of which the base rubber is anyone of the polybutadiene (a), the polybutadiene mixture (a)/(b), the polybutadiene mixture (a)/(c) and the polybutadiene mixture (a)/(d).

In the other embodiment, the present invention relates a solid golf ball composed of at least one layer of a rubber material formed from the rubber composition, of which the base rubber is anyone of the polybutadiene (a), the polybutadiene mixture (a)/(b), the polybutadiene mixture (a)/(c) and the polybutadiene mixture (a)/(d).

DETAILED DESCRIPTION OF THE INVENTION

The rubber composition using the specified polybutadiene or polybutadiene mixture of the present invention is vulcanized by press-molding under applied heat to obtain a one-piece solid golf ball as described above. The rubber composition of the present invention may be used for forming at least one portion or all of the core of a two-piece solid golf ball or a multi-piece solid golf ball, such as a three-piece solid golf ball, which consists of a core of rubber material and a cover of thermoplastic resin covering on the core. In order to explain the rubber composition for golf ball of the present invention simply, a core of two-piece golf ball will be mainly used hereinafter for explanation. However, the rubber composition may be applied to the one-piece golf ball and the core of the multi-piece solid golf ball other than the two-piece solid golf ball.

The solid golf ball of the present invention is formed by vulcanizing and press-molding the rubber composition described above to obtain a core, followed by covering the core with the cover. The core used for the solid golf ball of the present invention is obtained by vulcanizing and press-molding the rubber composition. The rubber composition comprises a base rubber, a co-crosslinking agent, an organic peroxide, an inorganic filler, and optionally antioxidant, and the like.

In the rubber composition for the golf ball of the present invention, it is required for the base rubber to comprise a polybutadiene (a) containing a cis-1,4 bond of not less than 80%, having a Mooney viscosity of not less than 30 to less than 50 $ML_{1+4}(100°$ C.) and a ratio (Mw/Mn) of weight average molecular weight (Mw) to number average molecular weight (Mn) of 3.0 to 6.0, synthesized using lanthanide-containing catalyst. The Mooney viscosity is within the range of preferably 32 to 48, more preferably 35 to 45 ML1+4(100° C.) and the ratio (Mw/Mn) is within the range of preferably 3.1 to 5.5, more preferably 3.2 to 5.0. When the Mooney viscosity is lower than 30 $ML_{1+4}(100°$ C.), the workability when producing is good, but the rebound characteristics are poor. On the other hand, when the Mooney viscosity is not less than 50 $ML_{1+4}(100°$ C.), the rebound characteristics are good, but the workability when producing is poor. When the ratio (Mw/Mn) is smaller than 3.0, the rebound characteristics are good, but the workability when producing is poor. On the other hand, when the ratio (Mw/Mn) is larger than 6.0, the workability when producing is good, but the rebound characteristics are poor. It is desired for the polybutadiene (a) to have a weight average molecular weight (Mw) of $50 \times 10^4$ to $90 \times 10^4$, preferably $55 \times 10^4$ to $80 \times 10^4$, more preferably $60 \times 10^4$ to $75 \times 10^4$. When the Mw is lower than $50 \times 10^4$, the rebound characteristics are not sufficiently obtained. On the other hand, when the Mw is higher than $90 \times 10^4$, the workability when producing is poor.

In the rubber composition for golf balls of the present invention, it is desired for the base rubber to be a polybutadiene mixture consisting of the polybutadiene (a) and a polybutadiene (b) containing a cis-1,4 bond of not less than 40%, having a Mooney viscosity of not less than 55 to less than 70 $ML_{1+4}$ (100° C.), synthesized using lanthanide-containing catalyst, a weight ratio (a)/(b) being 30/70 to 90/10. The Mooney viscosity of the polybutadiene (b) is within the range of preferably 58 to 67, more preferably 60 to 65 $ML_{1+4}(100°$ C.) and the weight ratio (a)/(b) is within the range of preferably 35/65 to 85/15, more preferably 40/60 to 80/20.

When the Mooney viscosity of the polybutadiene (b) is lower than 55 $ML_{1+4}(100°$ C.), the rebound characteristics are not sufficiently obtained. On the other hand, when the Mooney viscosity of the polybutadiene (b) is not less than 70 $ML_{1+4}(100°$ C.), the rebound characteristics are good, but the workability when producing is poor. When the amount of the polybutadiene (b) in the polybutadiene mixture is larger than 70% by weight, the rebound characteristics are good, but the workability when producing is poor too much. On the other hand, when the amount of the polybutadiene (b) is smaller than 10% by weight, the rebound characteristics are not sufficiently obtained. It is desired for the polybutadiene (b) to have a ratio (Mw/Mn) of weight average molecular weight (Mw) to number average molecular weight (Mn) of 1.0 to 3.0, preferably 1.4 to 2.7, more preferably 1.8 to 2.4. When the ratio (Mw/Mn) is smaller than 1.0, the rebound characteristics are sufficiently obtained, but the workability when producing is poor. On the other hand, when the ratio (Mw/Mn) is larger than 3.0, the rebound characteristics are not sufficiently obtained. It is desired for the polybutadiene (b) to have a weight average molecular weight (Mw) of $50 \times 10^4$ to $90 \times 10^4$, preferably $55 \times 10^4$ to $80 \times 10^4$, more preferably $60 \times 10^4$ to $70 \times 10^4$. When the Mw is lower than $50 \times 10^4$, the rebound characteristics are not sufficiently obtained. On the other hand, when the Mw is higher than $90 \times 10^4$, the rebound characteristics are sufficiently obtained, but the workability when producing is poor.

In the rubber composition for golf ball of the present invention, it is desired for the base rubber to be a polybutadiene mixture consisting of the polybutadiene (a) and a polybutadiene (c) containing a cis-1,4 bond of not less than 40%, having a Mooney viscosity of not less than 30 to less than 50 $ML_{1+4}$(100° C.) and a ratio (Mw/Mn) of weight average molecular weight (Mw) to number average molecular weight (Mn) of 3.6 to 8.0, synthesized using cobalt-containing catalyst and/or nickel-containing catalyst, a weight ratio (a)/(c) being 86/14 to 90/10. The Mooney viscosity of the polybutadiene (c) is within the range of preferably 35 to 48, more preferably 40 to 46 $ML_{1+4}$(100° C.), the ratio (Mw/Mn) is within the range of preferably 3.7 to 6.0, more preferably 3.8 to 5.0 and the weight ratio (a)/(c) is within the range of preferably 86/14 to 89/11, more preferably 87/13 to 89/11.

When the Mooney viscosity of the polybutadiene (c) is lower than 30 $ML_{1+4}$(100° C.), the rebound characteristics are not sufficiently obtained. On the other hand, when the Mooney viscosity of the polybutadiene (c) is not less than 50 $ML_{1+4}$(100° C.), the workability when producing is poor. When the ratio (Mw/Mn) is smaller than 3.6, the workability when producing is poor and the durability is poor. On the other hand, when the ratio (Mw/Mn) is larger than 8.0, the rebound characteristics are not sufficiently obtained. It is desired for the polybutadiene (c) to have a weight average molecular weight (Mw) of $50 \times 10^4$ to $90 \times 10^4$, preferably $52 \times 10^4$ to $85 \times 10^4$, more preferably $55 \times 10^4$ to $80 \times 10^4$. When the Mw is lower than $50 \times 10^4$, the rebound characteristics are not sufficiently obtained. On the other hand, when the Mw is higher than $90 \times 10^4$, the workability when producing is poor. When the amount of the polybutadiene (c) in the polybutadiene mixture is larger than 14% by weight, the rebound characteristics are not sufficiently obtained. On the other hand, when the amount of the polybutadiene (c) is smaller than 10% by weight, it is difficult to improve the durability.

In the rubber composition for golf ball of the present invention, it is desired for the base rubber to be a polybutadiene mixture consisting of the polybutadiene (a) and a polybutadiene (d) containing a cis-1,4 bond of not less than 40%, having a Mooney viscosity of not less than 50 $ML_{1+4}$(100° C.) and a ratio (Mw/Mn) of weight average molecular weight (Mw) to number average molecular weight (Mn) of not less than 2.0 to less than 4.0, synthesized using cobalt-containing catalyst, a weight ratio (a)/(d) being 30/70 to 90/10. The Mooney viscosity of the polybutadiene (d) is within the range of preferably 52 to 70, more preferably 54 to 65 $ML_{1+4}$(100° C.), the ratio (Mw/Mn) is within the range of preferably 2.1 to 3.5, more preferably 2.2 to 3.0 and the weight ratio (a)/(d) is within the range of preferably 32/68 to 80/20, more preferably 34/66 to 70/30.

When the Mooney viscosity of the polybutadiene (d) is lower than 50 $ML_{1+4}$(100° C.), the rebound characteristics are not sufficiently obtained. When the ratio (Mw/Mn) is smaller than 2.0, the workability when producing and the durability are poor. On the other hand, when the ratio (Mw/Mn) is not less than 4.0, the rebound characteristics are not sufficiently obtained. It is desired for the polybutadiene (d) to have a weight average molecular weight (Mw) of $50 \times 10^4$ to $80 \times 10^4$, preferably $53 \times 10^4$ to $70 \times 10^4$, more preferably $55 \times 10^4$ to $60 \times 10^4$. When the Mw is lower than $50 \times 10^4$, the rebound characteristics are not sufficiently obtained. On the other hand, when the Mw is higher than $80 \times 10^4$, the workability when producing is poor. When the amount of the polybutadiene (d) in the polybutadiene mixture is larger than 70% by weight, the workability when producing and the durability are poor.

The term "Mooney viscosity" as used herein refers to an indication of a viscosity which is measured using a Mooney viscometer as a kind of rotational plastometer. The Mooney viscosity is typically used for measuring a viscosity of a rubber composition in the field of rubber industry. The Mooney viscosity is determined by closely putting a rubber composition in a gap between a cylindrical dice and a rotor positioned at the center of the dice, and then measuring a torque occurring when rotating a rotor at a testing temperature of 100° C., for a preheating time of 1 minute, at the number of revolutions of 2 rpm, for the time of revolution of 4 minutes. The Mooney viscosity is expressed in $ML_{1+4}$ (100° C.), wherein M represents a Mooney viscosity, L represents a large rotor (L type) as a shape of the rotor, (1+4) represents that a preheating time is 1 minute and a time of revolution of the rotor is 4 minutes, and 100° C. represents a testing temperature. The measurement is generally conducted according to JIS K 6300.

Lanthanide-containing catalysts used to synthesize the polybutadienes (a) and (b) in the present invention are, for example, a combination of a lanthanide compound, an organoaluminum compound, a Lewis base and optionally a Lewis acid. Examples of the lanthanide compounds include halides, carboxylates, alcoholates, thioalcoholates and amides of rare earth metals having atomic numbers of 57 to 71, with neodymium being the preferred rare earth metal. Examples of the organoaluminum compounds include those having the general formula:

$$Al\ R_1R_2R_3$$

wherein $R_1$, $R_2$ and $R_3$, which may be the same or different, are independently selected from hydrogen or hydrocarbon group having 1 to 8 carbon atoms. The Lewis bases serve to convert the lanthanide compounds into complexes. Acetylacetone, ketone, alcohols and the like may be used for this purpose. Examples of the Lewis acids include aluminum halides of the general formula:

$$Al\ X_nR_{3-n}$$

wherein X is a halogen, R is alkyl, aryl or aralkyl group having 1 to 20 carbon atoms, and n is 1, 1.5, 2 or 3; or silicon tetrachloride, tin tetrachloride, titanium tetrachloride, and the like.

When butadiene is polymerized in the present of the lanthanide-containing catalyst, the molar ratio of butadiene to lanthanide compound is within the range of $5 \times 10^2$ to $5 \times 10^6$, preferably $1.0 \times 10^3$ to $1.0 \times 10^5$. The molar ratio of organoaluminum compound to lanthanide compound is within the range of 5 to 500, preferably 10 to 300. The molar ratio of Lewis base to lanthanide compound is within the range of at least 0.5, preferably 1 to 20. When Lewis acid is used, the molar ratio of halide in the Lewis acid to lanthanide compound is within the range of 1 to 10, preferably 1.5 to 5. In the polymerization of butadiene, the lanthanide-containing catalysts may be used as solution in an organic solvent such as n-hexane, cyclohexane, n-heptane, toluene, xylene, benzene and the like, or carried on suitable carriers such as silica, magnesia and magnesium chloride. The polymerization of butadiene may be carried out in a solvent, or bulk polymerization without a solvent may also be employed. The polymerization temperature is in the range of −30 to 150° C., and the polymerization pressure may vary depending on other conditions.

Nickel-containing catalysts used to synthesize the polybutadiene (c) in the present invention are, for example, one-component catalysts such as nickel on diatomaceous earth as a carrier, two-component catalysts such as Raney nickel/titanium tetrachloride, and three-component catalysts such as nickel compound/organometal/trifluoroborate etherate. Examples of nickel compounds include reduced nickel on carrier, Raney nickel, nickel oxide, nickel carboxylate, organic nickel complex salts and the like. Examples of the organometals include trialkyl aluminums such as triethyl aluminum, tri-n-propyl aluminum, triisobutyl aluminum, and tri-n-hexyl aluminum; alkyl lithiums such as n-butyl lithium, s-butyl lithium, t-butyl lithium and 1,4-butane dilithium; dialkyl zincs such as diethyl zinc, dibutyl zinc; and the like.

Polymerization of butadiene in the presence of these catalysts is generally carried out by continuously charging butadiene monomer into a reactor along with a conventional solvent and the catalyst such as nickel octanoate and triethyl aluminum, and controlling the reaction temperature in the range of 5 to 60° C. and the reaction pressure in the range of 1 to about 70 atmospheres, such that a product having a desired Mooney viscosity may be obtained.

Cobalt-containing catalysts used to synthesize the polybutadienes (c) and (d) in the present invention are, for example, cobalt metal and cobalt compounds such as Raney cobalt, cobalt chloride, cobalt bromide, cobalt iodide, cobalt oxide, cobalt sulfate, cobalt carbonate, cobalt phosphate, cobalt phthalate, cobalt carbonyl, cobalt acetylacetonate, cobalt diethyldithiocarbamate, cobalt dinitrosyl chloride, and the like. In particular, combinations of these cobalt compounds with a dialkyl aluminum monochloride such as diethyl aluminum monochloride and diisobutyl aluminum monochloride; a trialkyl aluminum such as triethyl aluminum, tri-n-propyl aluminum, triisobutyl aluminum and tri-n-hexyl aluminum; an alkyl aluminum sesquichloride such as ethyl aluminum sesquichloride; aluminum chloride; and the like are preferred catalysts for use in the preparation of polybutadiene of cis-1,4 bond type. Polymerization of butadiene in the presence of the cobalt-containing catalysts is generally carried out by the similar process to that used with the nickel-containing catalysts.

In the present invention, metal salt of $\alpha,\beta$-unsaturated carboxylic acid is used as the co-crosslinking agent. Examples of the $\alpha,\beta$-unsaturated -unsaturated carboxylic acid include $\alpha,\beta$-unsaturated -unsaturated carboxylic acids having 3 to 8 carbon atoms, such as acrylic acid, methacrylic acid, cinnamic acid, crotonic acid, itaconic acid, fumaric acid and the like. Preferred are acrylic acid and methacrylic acid. Examples of the metal salts include sodium, potassium, lithium, magnesium, calcium, zinc, barium, aluminum, tin, zirconium, cadmium salts, and the like. Preferred are a sodium salt, zinc salt and magnesium salt. The amount of the co-crosslinking agent is from 20 to 50 parts by weight, preferably from 25 to 40 parts by weight, more preferably from 28 to 35 parts by weight, based on 100 parts by weight of the base rubber. When the amount of the co-crosslinking agent is smaller than 20 parts by weight, a desired hardness of the core is sufficiently obtained. On the other hand, when the amount of the co-crosslinking agent is larger than 50 parts by weight, the core is too hard, and the shot feel of the resulting golf ball is poor. The metal salt of $\alpha,\beta$-unsaturated carboxylic acid may be compounded as a combination of the $\alpha,\beta$-unsaturated carboxylic acid and a metal oxide such as zinc oxide, which are separately compounded and react with each other during mixing the rubber composition to form a metal salt of $\alpha,\beta$-unsaturated carboxylic acid.

The organic peroxide, which acts as crosslinking agent or curing agent, includes for example dicumyl peroxide, di-t-butyl peroxide, 1,1-di-t-butylperoxy-3,3,5-trimethylcyclohexane, 2,5-dimethyl-2,5-di(t-butylperoxy) hexane, and the like. The preferred organic peroxide is dicumyl peroxide. The amount of the organic peroxide is from 0.1 to 5.0 parts by weight, preferably from 0.2 to 4.0 parts by weight, more preferably from 0.2 to 3.5 parts by weight, based on 100 parts by weight of the base rubber. When the amount of the organic peroxide is smaller than 0.1 parts by weight, crosslinking reaction does not sufficiently occur, and a desired hardness of the core is sufficiently obtained. On the other hand, when the amount of the organic peroxide is larger than 5.0 parts by weight, the core is too hard, and the durability of the resulting golf ball is poor.

The inorganic filler includes, for example, zinc oxide, barium sulfate, calcium carbonate, silica and the like. The preferred inorganic filler is zinc oxide, which also acts as a vulcanization aid. The amount of the inorganic filler is from 3 to 40 parts by weight, preferably from 4 to 35 parts by weight, more preferably from 4 to 30 parts by weight, based on 100 parts by weight of the base rubber. When the amount of the inorganic filler is smaller than 3 parts by weight, crosslinking reaction does not sufficiently occur, and a desired hardness of the core is sufficiently obtained. On the other hand, when the amount of the filler is larger than 40 parts by weight, the rebound characteristics of the resulting golf ball are degraded.

The rubber composition for the solid golf ball of the present invention can contain other components, which have been conventionally used for preparing the core of solid golf balls, such as peptizing agent or antioxidant. If used, the amount of the antioxidant is preferably 0.2 to 1.5 parts by weight, based on 100 parts by weight of the base rubber.

The golf ball of the present invention may be a one-piece solid golf ball obtained by integrally molding the rubber composition, of which the base rubber is anyone of the polybutadiene (a), the polybutadiene mixture (a)/(b), the polybutadiene mixture (a)/(c) and the polybutadiene mixture (a)/(d); a two-piece solid golf ball obtained by covering a core formed from the rubber composition with a cover; or a multi-piece solid golf ball such as a three-piece solid golf ball having at least one layer of a rubber material formed from the rubber composition.

In the golf ball of the present invention, the core has a diameter of 37.7 to 42.1 mm, preferably 38.7 to 41.7 mm. When the diameter of the core is larger than 42.1 mm, the thickness of the cover is too thin, and the durability of the resulting golf ball is poor. On the other hand, when the diameter of the core is smaller than 37.7 mm, it is required to increase the thickness of the cover, and the technical effects accomplished by the presence of the core are not sufficiently obtained. Therefore, the shot feel is poor.

In the golf ball of the present invention, the core has a deformation amount when applying from an initial load of 98 N to a final load of 1275 N of 2.0 to 4.5 mm, preferably 2.2 to 4.0 mm, more preferably 2.4 to 3.8 mm. When the deformation amount of the core is smaller than 2.0 mm, the core is too hard, and the shot feel of the resulting golf ball is poor. On the other hand, when the deformation amount is larger than 4.5 mm, the core is too soft, and the rebound characteristics of the resulting golf ball are degraded. In the case of one-piece golf ball, the golf ball itself has the above physical properties of the core of two-piece golf ball.

The cover is then covered on the core. In the golf ball of the present invention, the cover may be formed from thermoplastic resin, particularly ionomer resin, which has been conventionally used for the cover of solid golf balls, or the mixture of thereof. The ionomer resin may be a copolymer of α-olefin and α,β-unsaturated carboxylic acid having 3 to 8 carbon atoms, of which a portion of carboxylic acid groups is neutralized with metal ion, a terpolymer of α-olefin, α,β-unsaturated carboxylic acid having 3 to 8 carbon atoms and α,β-unsaturated carboxylic acid ester, of which a portion of carboxylic acid groups is neutralized with metal ion, or mixtures thereof. Examples of the α-olefins in the ionomer preferably include ethylene, propylene and the like. Examples of the α,β-unsaturated carboxylic acid in the ionomer include acrylic acid, methacrylic acid, fumaric acid, maleic acid, crotonic acid and the like, preferred are acrylic acid and methacrylic acid. Examples of the α,β-unsaturated carboxylic acid ester in the ionomer include methyl ester, ethyl ester, propyl ester, n-butyl ester and isobutyl ester of acrylic acid, methacrylic acid, fumaric acid, maleic acid, crotonic acid and the like. Preferred are acrylic acid esters and methacrylic acid esters. The metal ion which neutralizes a portion of carboxylic acid groups of the copolymer includes alkali metal ion, such as sodium ion, potassium ion, lithium ion and the like; divalent metal ion, such as zinc ion, calcium ion, magnesium ion, and the like; trivalent metal ion, such as an aluminum ion, a neodymium ion and the like; and the mixture thereof. Preferred are sodium ions, zinc ions, lithium ions and the like, in view of rebound characteristics, durability and the like.

The ionomer resin is not limited, but examples thereof will be shown by a trade name thereof. Examples of the ionomer resins, which are commercially available from Du Pont-Mitsui Polychemicals Co., Ltd. include Hi-milan 1555, Hi-milan 1557, Hi-milan 1601, Hi-milan 1605, Hi-milan 1652, Hi-milan 1702, Hi-milan 1705, Hi-milan 1706, Hi-milan 1707, Hi-milan 1855, Hi-milan 1856, Hi-milan AM7316 and the like. Examples of the ionomer resins, which are commercially available from Du Pont Co., include Surlyn 8945, Surlyn 9945, Surlyn 6320, Surlyn 8320, Surlyn AD8511, Surlyn AD8512, Surlyn AD8542 and the like. Examples of the ionomer resins, which are commercially available from Exxon Chemical Co., include Iotek 7010, Iotek 8000 and the like. These ionomer resins may be used alone or in combination.

As the materials suitably used in the cover of the present invention, the above ionomer resin may be used alone, but the ionomer resin may be used in combination with at least one of thermoplastic elastomer, diene block copolymer and the like. Examples of the thermoplastic elastomers include polyamide-based thermoplastic elastomer, which is commercially available from Toray Co., Ltd. under the trade name of "Pebax" (such as "Pebax 2533"); polyester-based thermoplastic elastomer, which is commercially available from Toray-Du Pont Co., Ltd. under the trade name of "Hytrel" (such as "Hytrel 3548", "Hytrel 4047"); polyurethane-based thermoplastic elastomer, which is commercially available from Takeda Badische Urethane Industries, Ltd. and the like.

The diene-based block copolymer is a block copolymer or partially hydrogenated block copolymer having double bond derived from conjugated diene compound. The base bock copolymer is block copolymer composed of block polymer block A mainly comprising at least one aromatic vinyl compound and polymer block B mainly comprising at least one conjugated diene compound. The partially hydrogenated block copolymer is obtained by hydrogenating the block copolymer. Examples of the aromatic vinyl compounds comprising the block copolymer include styrene, α-methyl styrene, vinyl toluene, p-t-butyl styrene, 1,1-diphenyl styrene and the like, or mixtures thereof. Preferred is styrene. Examples of the conjugated diene compounds include butadiene, isoprene, 1,3-pentadiene, 2,3-dimethyl-1,3-butadiene and the like, or mixtures thereof. Preferred are butadiene, isoprene and combinations thereof. Examples of the diene block copolymers include an SBS (styrene-butadiene-styrene) block copolymer having polybutadiene block with epoxy groups or SIS (styrene-isoprene-styrene) block copolymer having polyisoprene block with epoxy groups and the like. Examples of the diene block copolymers which is commercially available include the diene block copolymers, which are commercially available from Daicel Chemical Industries, Ltd. under the trade name of "Epofriend" (such as "Epofriend A1010"), the diene-based block copolymers, which are commercially available from Kuraray Co., Ltd. under the trade name of "Septon" (such as "Septon HG-252" and the like) and the like.

The amount of the thermoplastic elastomer or diene-based block copolymer is 1 to 60 parts by weight, preferably 1 to 35 parts by weight, based on 100 parts by weight of the base resin for the cover. When the amount is smaller than 1 parts by weight, the technical effects of improving shot feel accomplished by the presence of the thermoplastic elastomer or diene-based block copolymer are not sufficiently obtained. On the other hand, when the amount is larger than 60 parts by weight, the cover is too soft, and the rebound characteristics are degraded, or the compatibility with the ionomer resin is degraded, and the durability is degraded.

The composition for the cover used in the present invention may optionally contain pigments (such as titanium dioxide, etc.), fillers (such as barium sulfate, etc.) and the other additives such as a dispersant, an antioxidant, a UV absorber, a photostabilizer and a fluorescent agent or a fluorescent brightener, etc., in addition to the above resin component as a main component, as long as the addition of the additives does not deteriorate the desired performance of the golf ball cover. The amount of the pigment is preferably from 0.01 to 10.0 parts by weight, based on 100 parts by weight of the cover resin component.

A method of covering on the core with the cover is not specifically limited, but may be a conventional method for forming golf ball cover well known in the art. For example, there can be used a method comprising molding the cover composition into a semi-spherical half-shell in advance, covering the core with the two half-shells, followed by pressure molding at 130 to 170° C. for 1 to 15 minutes, or a method comprising injection molding the cover composition directly on the core. The cover preferably has a thickness of 0.5 to 3.0 mm. At the time of molding the cover, many depressions called "dimples" are formed on the surface of the golf ball. Furthermore, paint finishing or marking with a stamp may be optionally provided after the cover is molded for commercial purposes. The golf ball of the present invention is formed, so that it has a diameter of not less than 42.67 mm (preferably 42.67 to 42.82 mm) and a weight of not more than 45.93 g, in accordance with the regulations for golf balls.

The diameter of golf balls is limited to not less than 42.67 mm in accordance with the regulations for golf balls as described above. Generally, when the diameter of the golf ball is large, air resistance of the golf ball on a flight is large, which reduces the flight distance. Therefore, most of golf balls commercially available are designed to have a diameter of 42.67 to 42.82 mm. The present invention is applicable to the golf balls having the diameter. There are golf balls having large diameter in order to improve the easiness of hitting. In addition, there are cases where golf balls having a diameter out of the regulations for golf balls are required depending on the demand and object of users. Therefore, it can be considered for golf balls to have a diameter of 42 to 44 mm, more widely 40 to 45 mm. The present invention is also applicable to the golf balls having the diameter.

In the golf ball of the present invention, it is desired to have a compression (deformation amount) of 50 to 120, preferably 65 to 110, more preferably 80 to 100. When the compression is larger than 120, the golf ball is too hard, and the shot feel is poor. On the other hand, when the deformation amount is smaller than 50, the golf ball is too soft, and the rebound characteristics are degraded, which reduces the flight distance.

EXAMPLES

The following Examples and Comparative Examples further illustrate the present invention in detail but are not to be construed to limit the scope of the present invention.

(Preparation No. 1 to 5)

Preparation of Polybutadiene

The polybutadienes of Preparation Nos. 1 to 5 were prepared using the reaction condition shown in Table 1. Mooney viscosity, content of cis-1,4 bond, number average molecular weight (Mn) and weight average molecular weight (Mw) of the resulting polybutadienes were measured, and the ratio thereof (Mw/Mn) was determined by calculation. The results are shown in the same Tables.

(Examples 1 to 7 and Comparative Examples 1 to 5)

Production of Cores

The rubber compositions for cores having formulations shown in Table 2 (Examples) and Table 3 (Comparative Examples) comprising the above polybutadienes of Preparation Nos. 1 to 5 were mixed with a mixing roll, and then vulcanized by press-molding at 160° C. for 25 minutes to obtain spherical cores having a diameter of 39.0 mm and a weight of 39.4 g. The workability of roll mixing of the rubber composition was evaluated, and the deformation amount and coefficient of restitution of the resulting core were measured, and the results are shown in Table 7 (Example) and Table 8 (Comparative Example). The test methods are described later.

TABLE 2

| | Example No. | | | | | | |
| --- | --- | --- | --- | --- | --- | --- | --- |
| Core composition | 1 | 2 | 3 | 4 | 5 | 6 | 7 |
| Polybutadiene | | | | | | | |
| Preparation No. 1 | 100 | 35 | 50 | 82 | 88 | 88 | 35 |
| Preparation No. 2 | — | 65 | 50 | 20 | — | — | — |
| Preparation No. 3 | — | — | — | — | 12 | — | — |
| Preparation No. 4 | — | — | — | — | — | 12 | — |
| Preparation No. 5 | — | — | — | — | — | — | 65 |
| Zinc acrylate | 30 | 30 | 30 | 30 | 30 | 30 | 30 |
| Zinc oxide | 18 | 18 | 18 | 18 | 18 | 18 | 18 |
| Dicumyl peroxide | 1.2 | 1.2 | 1.2 | 1.2 | 1.2 | 1.2 | 1.2 |

TABLE 3

| | Comparative Example No. | | | | |
| --- | --- | --- | --- | --- | --- |
| Core composition | 1 | 2 | 3 | 4 | 5 |
| Polybutadiene | | | | | |
| Preparation No. 1 | — | 25 | 80 | 80 | 25 |
| Preparation No. 2 | — | 75 | — | — | — |
| Preparation No. 3 | 100 | — | 20 | — | — |
| Preparation No. 4 | — | — | — | 20 | — |
| Preparation No. 5 | — | — | — | — | 75 |
| Zinc acrylate | 30 | 30 | 30 | 30 | 30 |

TABLE 1

| | Preparation No. | | | | |
| --- | --- | --- | --- | --- | --- |
| Polybutadiene | 1 | 2 | 3 | 4 | 5 |
| Type of Catalyst | Lanthanide | Lanthanide | Nickel | Cobalt | Cobalt |
| Mooney viscosity [$ML_{1+4}$ (100° C.)] *1 | 40 | 63 | 40 | 38 | 52 |
| Content of cis-1,4-bond (%) *2 | 98 | 98 | 97 | 98 | 98 |
| Weight average molecular weight (Mw) *3 | $73 \times 10^4$ | $64 \times 10^4$ | $84 \times 10^4$ | $63 \times 10^4$ | $61 \times 10^4$ |
| Number average molecular weight (Mn) *3 | $21 \times 10^4$ | $31 \times 10^4$ | $19 \times 10^4$ | $16 \times 10^4$ | $25 \times 10^4$ |
| Ratio (Mw/Mn) | 3.5 | 2.1 | 4.4 | 4.0 | 2.4 |

*1: Measurement according to JIS K 6300
*2: NMR (Nuclear magnetic resonance)
*3: GPC (Gel permeation chromatography)

TABLE 3-continued

| Core composition | Comparative Example No. | | | | |
|---|---|---|---|---|---|
| | 1 | 2 | 3 | 4 | 5 |
| Zinc oxide | 18 | 18 | 18 | 18 | 18 |
| Dicumyl peroxide | 1.2 | 1.2 | 1.2 | 1.2 | 1.2 |

Preparation of Cover Compositions

The formulation materials for the cover shown in Table 4 were mixed using a kneading type twin-screw extruder to obtain pelletized cover compositions. The extrusion condition was, a screw diameter of 45 mm,
a screw speed of 200 rpm, and
a screw L/D of 35.

The formulation materials were heated at 200 to 260° C. at the die position of the extruder.

TABLE 4

| Cover composition | Amount (parts by weight) |
|---|---|
| Hi-milan 1605 *4 | 50 |
| Hi-milan 1706 *5 | 50 |
| Titanium dioxide | 2.0 |

*4: Hi-milan 1605 (trade name), ethylene-methacrylic acid copolymer ionomer resin obtained by neutralizing with sodium ion, manufactured by Du Pont-Mitsui Polychemicals Co., Ltd.
*5: Hi-milan 1706 (trade name), ethylene-methacrylic acid copolymer ionomer resin obtained by neutralizing with zinc ion, manufactured by Du Pont-Mitsui Polychemicals Co., Ltd.

Production of Golf balls (Formation of Cover)

The cover compositions were covered on the resulting core by injection molding to obtain two-piece solid golf balls having a diameter of 42.7 mm and a weight of 45.4 g. The compression (ball compression), coefficient of restitution and durability of the resulting golf balls were measured or evaluated, and the results are shown in Table 7 (Example) and Table 8 (Comparative Example). The test methods are described later.

(Examples 8 to 11 and Comparative Examples 6 to 9)

The rubber compositions for golf balls having formulations shown in Table 5 comprising the polybutadienes shown in Table 1 were mixed, and then vulcanized by press-molding at 170° C. for 20 minutes to obtain one-piece solid golf balls having a diameter of 42.7 mm and a weight of 45.4 g. The workability of roll mixing of the rubber composition was evaluated, and the compression (ball compression), coefficient of restitution and durability of the resulting golf ball were measured or evaluated. The results are shown in Table 8 and Table 9. The test methods are described later.

TABLE 5

| Ball composition | Example No. | | | | Comparative Example No. | | | |
|---|---|---|---|---|---|---|---|---|
| | 8 | 9 | 10 | 11 | 6 | 7 | 8 | 9 |
| Polybutadiene | | | | | | | | |
| Preparation No. 1 | 100 | 35 | 88 | 88 | — | 25 | 80 | 80 |
| Preparation No. 2 | — | 65 | — | — | — | 75 | — | — |
| Preparation No. 3 | — | — | 12 | — | 100 | — | 20 | — |
| Preparation No. 4 | — | — | — | 12 | — | — | — | 20 |
| Preparation No. 5 | — | — | — | — | — | — | — | — |
| Methacrylic acid | 25 | 25 | 25 | 25 | 25 | 25 | 25 | 25 |
| Zinc oxide | 26 | 26 | 26 | 26 | 26 | 26 | 26 | 26 |
| Dicumyl peroxide | 1.0 | 1.0 | 1.0 | 1.0 | 1.0 | 1.0 | 1.0 | 1.0 |

Test Methods (1) Deformation Amount of the Core

The deformation amount was determined by measuring the deformation amount when applying from an initial load of 98 N to a final load of 1275 N on the core.

(2) Coefficient of Restitution

A stainless steel cylinder having a weight of 198.4 g was struck at a speed of 45 cm/sec against a golf ball or a core using a compressed-air actuated resilience gun, and the velocity of the cylinder and the golf ball or the core before and after the strike were measured. The larger the coefficient of restitution is, the more excellent the rebound characteristics are.

(3) Ball Compression

The ball compression of golf balls was determined by the PGA method.

(4) Durability

After a No. 1 wood club (a driver, W#1) was mounted to a swing robot manufactured by True Temper Co., a golf ball was hit at a head speed of 45 m/second, repeatedly. The durability is the number of strike until the cover of the golf ball cracks, and is indicated by an index when that of Comparative example 1 is 100. When the number is more than 100, the golf ball has better durability than the golf ball of Comparative Example 1. The larger the number is, the better durability the golf ball has.

(5) Workability of Roll Mixing

Workability when mixing the rubber composition by a mixing roll is evaluated. The evaluation criteria are as follows.

Evaluation criteria o: Workability is good.

x: Workability is poor, because it is difficult to wind the rubber composition around the roll.

Test Results

TABLE 6

| Test item | Example No. | | | | | | |
|---|---|---|---|---|---|---|---|
| | 1 | 2 | 3 | 4 | 5 | 6 | 7 |
| (Core) | | | | | | | |
| Deformation amount (mm) | 2.98 | 3.02 | 2.95 | 2.97 | 2.99 | 2.97 | 2.95 |
| Coefficient of restitution | 0.793 | 0.795 | 0.794 | 0.793 | 0.792 | 0.792 | 0.793 |
| (Golf ball) | | | | | | | |
| Compression | 95 | 96 | 95 | 94 | 96 | 95 | 94 |
| Coefficient of restitution | 0.785 | 0.788 | 0.786 | 0.785 | 0.785 | 0.784 | 0.785 |
| Durability | 100 | 95 | 97 | 99 | 105 | 107 | 97 |
| Workability of roll mixing | ○ | ○ | ○ | ○ | ○ | ○ | ○ |

TABLE 7

| Test item | Comparative Example No. | | | | |
|---|---|---|---|---|---|
| | 1 | 2 | 3 | 4 | 5 |
| (Core) | | | | | |
| Deformation amount (mm) | 3.01 | 2.98 | 2.96 | 3.02 | 3.03 |
| Coefficient of restitution | 0.780 | 0.796 | 0.783 | 0.782 | 0.792 |
| (Golf ball) | | | | | |
| Compression | 96 | 95 | 95 | 96 | 95 |
| Coefficient of restitution | 0.772 | 0.789 | 0.775 | 0.775 | 0.784 |
| Durability | 100 | 80 | 110 | 120 | 80 |
| Workability of roll mixing | x | x | ○ | ○ | x |

TABLE 8

| Test item | Example No. | | | |
|---|---|---|---|---|
| | 8 | 9 | 10 | 11 |
| (Golf ball) | | | | |
| Compression | 95 | 96 | 96 | 95 |
| Coefficient of restitution | 0.701 | 0.703 | 0.699 | 0.698 |
| Durability | 100 | 98 | 104 | 105 |
| Workability of roll mixing | ○ | ○ | ○ | ○ |

TABLE 9

| Test item | Comparative Example No. | | | |
|---|---|---|---|---|
| | 6 | 7 | 8 | 9 |
| (Golf ball) | | | | |
| Compression | 96 | 95 | 96 | 95 |
| Coefficient of restitution | 0.682 | 0.705 | 0.685 | 0.685 |
| Durability | 100 | 96 | 116 | 120 |
| Workability of roll mixing | x | x | ○ | ○ |

As is apparent from the results shown in Tables 6 to 9, the two-piece solid golf balls of Examples 1 to 7 using the polybutadiene or mixtures thereof of the present invention for the core have excellent rebound characteristics, excellent durability and good workability of roll mixing, compared with the two-piece solid golf balls of Comparative Examples 1 to 5. Similarly, the one-piece solid golf balls of Examples 8 to 11 using the polybutadiene or mixtures thereof of the present invention have excellent rebound characteristics, excellent durability and good workability of roll mixing, compared with the one-piece solid golf balls of Comparative Examples 6 to 9.

(Two-Piece Solid Golf Ball)

In the golf ball of Comparative Example 1, since the polybutadiene synthesized using nickel-containing catalyst (polybutadiene (c)) is only used as a base rubber of the rubber composition for the core, the coefficient of restitution is small and the workability of roll mixing is poor. In the golf ball of Comparative Example 2, the polybutadiene mixture (a)/(b) is used as a base rubber of the rubber composition for the core. However, since the weight ratio of the polybutadiene (a) is small, the workability of roll mixing and durability are poor. In the golf ball of Comparative Examples 3 and 4, the polybutadiene mixture (a)/(c) is used as a base rubber of the rubber composition for the core. However, since the weight ratio of the polybutadiene (a) is small, the coefficient of restitution is small. In the golf ball of Comparative Example 5, the polybutadiene mixture (a)/(d) is used as a base rubber of the rubber composition for the core. However, since the weight ratio of the polybutadiene (a) is small, the workability of roll mixing and durability are poor.

(One-Piece Solid Golf Ball)

In the golf ball of Comparative Example 6, since the polybutadiene synthesized using nickel-containing catalyst (polybutadiene (c)) is only used as a base rubber of the rubber composition for the golf ball, the coefficient of restitution is small and the workability of roll mixing is poor. In the golf ball of Comparative Example 7, the polybutadiene mixture (a)/(b) is used as a base rubber of the rubber composition for the golf ball. However, since the weight ratio of the polybutadiene (a) is small, the workability of roll mixing and durability are poor. In the golf ball of Comparative Examples 8 and 9, the polybutadiene mixture (a)/(c) is used as a base rubber of the rubber composition for the golf ball. However, since the weight ratio of the polybutadiene (a) is small, the coefficient of restitution is small.

What is claimed is:

1. A rubber composition for a golf ball comprising a base rubber, a co-crosslinking agent, an organic peroxide and an inorganic filler, wherein the base rubber is a polybutadiene mixture consisting of
   a polybutadiene (a) containing a cis-1,4 bond of not less than 80%, having a Mooney viscosity of not less than 30 to less than 50 ML 1+4(100° C.), synthesized using lanthanide-containing catalyst and
   a polybutadiene (b) containing a cis-1,4 bond of not less than 40%, having a Mooney viscosity of not less than 55 to less than 70 ML1+4(100° C.), a ratio (Mw/Mn) of weight average molecular weight (Mw) to number average molecular weight (Mn) of 1.0 to 3.0, synthesized using lanthanide-containing catalyst,
   a weight ratio (a)/(b) being 30/70 to 90/10.

2. The one-piece solid golf ball formed from the rubber composition according to claim 1.

3. The solid golf ball containing at least one layer of a rubber material, wherein the rubber material is formed from the rubber composition according to claim 1.

* * * * *